Patented Mar. 16, 1926.

1,576,544

UNITED STATES PATENT OFFICE.

CLARENCE E. PIGG, OF TERRE HAUTE, INDIANA, ASSIGNOR TO COMMERCIAL SOLVENTS CORPORATION, OF TERRE HAUTE, INDIANA, A CORPORATION OF MARYLAND.

PROCESS FOR THE PRODUCTION OF BUTYRIC ALDEHYDE.

No Drawing.    Application filed July 25, 1924.    Serial No. 728,176.

*To all whom it may concern:*

Be it known that I, CLARENCE E. PIGG, a citizen of the United States, and a resident of Terre Haute, in the county of Vigo and State of Indiana, have invented a certain new and useful Process for the Production of Butyric Aldehyde, of which the following is a specification.

My invention relates to the preparation of butyric aldehyde by the catalytic dehydrogenation of normal butyl alcohol by means of a dehydrogenating catalyst such as fused cupric oxide or copper.

D. A. Legg has described such a process in United States Patent 1,418,448. The vapors of normal butyl alcohol are led over the catalyst at a temperature between 200° and 350° C. At this temperature, in the presence of the copper catalyst, a dehydrogenation occurs and the butyl alcohol is transformed to normal butyric aldehyde with the elimination of free hydrogen gas. The vapors are led off from the catalyst into a condenser, where the hydrogen gas is separated and the butyric aldehyde and by-products are liquefied. The butyric aldehyde is then recovered by fractional distillation.

The copper catlyst preferably used in the process is that described by D. A. Legg in United States Patent 1,401,117. This catalyst may be prepared by heating copper oxide, granular or powdered, in a reverberatory hearth furnace for fifteen minutes under a direct gas flame at about 1100° C. During the heating period the copper oxide mass is raked or otherwise agitated and at the end of the heating period it is removed as a fused spongy mass. Other dehydrogenating catalysts, as for example, brass catalysts, may be used.

By the process described above, about seventy per cent of the normal butyl alcohol vapor is converted to butyric aldehyde. The thirty per cent of unconverted material is not all recovered as normal butyl alcohol, but consists largely of by-products and decomposition products such as butyric acid, butyl butyrate, acetals, and high-boiling decomposition or condensation products of butyric aldehyde.

I have discovered a new and improved process for the production of butyric aldehyde from normal butyl alcohol, whereby the yield of butyric aldehyde is increased and the formation of by-products and decomposition products is largely inhibited. I have found in employing the process previously described, that the presence of a small quantity of water vapor in the butyl alcohol vapors undergoing dehydrogenation will improve the dehydrogenation and inhibit the reactions which form by-products.

Thus by my improved process I am able to produce butyric aldehyde in yields of ninety per cent, and the unconverted residue is largely pure normal butyl alcohol which can be sent through the process again without purification. The presence of the water vapor during the dehydrogenation inhibits the other reactions previously mentioned, and thus reduces the cost of purification of the butyric aldehyde which is easily separable from butyl alcohol and difficultly separable from the by-products previously mentioned.

In employing my improved process I have found that the amount of water vapor necessarily present in the butyl alcohol vapor to secure the desirable results previously mentioned, may vary from two per cent to eighteen per cent of the weight of butyl alcohol vapor.

The presence of an amount smaller than two per cent does not completely inhibit the side reactions, and an amount greater than eighteen per cent slows up the catalytic conversion unnecessarily. I prefer to use a medium quantity of about ten per cent. The requisite water may be added to the butyl alcohol vapors in the form of steam and the mixture then passed over the catalyst, or normal butyl alcohol containing water in solution may be vaporized and passed over the catalyst.

Now, having described my invention, I desire to claim the following as new and novel:—

1. A process for the production of butyric aldehyde consisting in passing a mixture of normal butyl alcohol vapor and water vapor over a dehydrogenating catalyst at a temperature of 200–350° C., and condensing the vapors.

2. A process for the production of butyric aldehyde consisting in passing a mixture of normal butyl alcohol and water vapor over a dehydrogenating copper catalyst at a temperature of 200–350° C., condensing the vapors, and separating the butyric aldehyde by fractional distillation.

3. A process for the production of butyric aldehyde consisting in passing normal butyl alcohol vapor containing from two to eighteen per cent of water vapor over a dehydrogenating catalyst at 200–350° C., and condensing the vapors.

4. A process for the production of butyric aldehyde consisting in passing normal butyl alcohol vapor containing from two to eighteen per cent of water vapor over a dehydrogenating copper catalyst at 200–350° C., and condensing the vapors.

5. A process for the production of butyric aldehyde consisting in passing normal butyl alcohol vapor containing from two to eighteen per cent of water vapor over a dehydrogenating catalyst at 200–350° C., condensing the vapors, and removing the butyric aldehyde by fractional distillation.

6. In a process for the production of butyric aldehyde by the catalytic dehydrogenation of normal butyl alcohol at a temperature of 200–350° C., the step which comprises adding from two to eighteen per cent of water vapor to the butyl alcohol vapor before dehydrogenation.

7. In a process for the production of butyric aldehyde by the catalytic dehydrogenation of normal butyl alcohol at a temperature of 200–350° C., the step which comprises adding from two to eighteen per cent of water to the butyl alcohol before vaporization.

8. In a process for the production of butyric aldehyde by the catalytic dehydrogenation of normal butyl alcohol at a temperature of 200–350° C., the step which consists in conducting the catalytic dehydrogenation in the presence of water vapor.

9. In a process for the production of butyric aldehyde by the catalytic dehydrogenation of normal butyl alcohol at a temperature of 200–350° C., the step which consists in conducting the catalytic dehydrogenation in the presence of from two to eighteen per cent of water vapor.

CLARENCE E. PIGG.